US011131655B2

(12) United States Patent
Thoeing et al.

(10) Patent No.: US 11,131,655 B2
(45) Date of Patent: Sep. 28, 2021

(54) DYNAMIC CONTROL OF ACCUMULATION OF TIME FOR CHROMATOGRAPHY MASS SPECTROMETRY

(71) Applicant: Thermo Fisher Scientific (Bremen) GmbH, Bremen (DE)

(72) Inventors: Christian Thoeing, Blender (DE); Mathias Mueller, Bremen (DE); Shannon Eliuk, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 0 days.

(21) Appl. No.: 16/879,603

(22) Filed: May 20, 2020

(65) Prior Publication Data

US 2020/0371073 A1    Nov. 26, 2020

(30) Foreign Application Priority Data

May 22, 2019 (GB) ..................................... 1907220

(51) Int. Cl.
*G01N 30/72* (2006.01)
*H01J 49/00* (2006.01)
(Continued)

(52) U.S. Cl.
CPC ...... *G01N 30/7233* (2013.01); *H01J 49/0031* (2013.01); *H01J 49/40* (2013.01); *H01J 49/425* (2013.01); *H01J 49/4265* (2013.01)

(58) Field of Classification Search
CPC .. G01N 30/7233; H01J 49/0031; H01J 49/40; H01J 49/425; H01J 49/4265
(Continued)

(56) References Cited

U.S. PATENT DOCUMENTS

| 5,107,109 A | 4/1992 | Stafford, Jr. et al. |
| 2013/0105682 A1* | 5/2013 | Geromanos ......... H01J 49/0031 250/282 |

(Continued)

FOREIGN PATENT DOCUMENTS

| GB | 2559395 A | 8/2018 |
| JP | S60207051 A | 10/1985 |

(Continued)

OTHER PUBLICATIONS

Combined Search and Examination Report dated Nov. 7, 2019, issued to GB Patent Application No. GB1907220.6.
(Continued)

*Primary Examiner* — Nicole M Ippolito (57) ABSTRACT

A method of mass spectrometry is provided. The method comprises eluting a sample from a chromatography system, and calculating a desired maximum scan duration for the sample eluting from the chromatographic system based on a duration of a chromatographic peak of the sample as it elutes from the chromatography system, and a minimum number of scans per chromatographic peak to be performed. A maximum accumulation duration is calculated based on the desired maximum scan duration. The sample is ionised to produce sample ions using an ion source. The sample ions are directed along an ion path from the ion source to a mass analyser. A first set of mass analysis scans are performed. Each of the first set of mass analysis scans comprises: accumulating a portion of sample ions at a point along the ion path, wherein the portion of sample ions are accumulated for a duration not exceeding the maximum accumulation duration, and mass analysing the portion of sample ions using the mass analyser. The mass analyser is a Fourier Transform mass analyser or a Time of Flight mass analyser.

23 Claims, 3 Drawing Sheets

(51) Int. Cl.
    *H01J 49/40*        (2006.01)
    *H01J 49/42*        (2006.01)
(58) Field of Classification Search
    USPC ............... 250/281, 282, 283, 286, 287, 288
    See application file for complete search history.

(56) References Cited

U.S. PATENT DOCUMENTS

| | | | |
|---|---|---|---|
| 2016/0035549 A1 | 2/2016 | Blethrow | |
| 2018/0224406 A1* | 8/2018 | Xuan | ................. H01J 49/0081 |

FOREIGN PATENT DOCUMENTS

| | | | |
|---|---|---|---|
| JP | 2006526265 | A | 11/2006 |
| JP | 2006343319 | A | 12/2006 |
| JP | 2014519603 | A | 8/2014 |
| WO | WO-2006103412 | A2 | 10/2006 |
| WO | WO-2013171554 | A1 | 11/2013 |
| WO | WO-2016196432 | A1 | 12/2016 |

OTHER PUBLICATIONS

Office action dated May 13, 2021, to JP Patent Application No. 2020-089409.

* cited by examiner

DYNAMIC CONTROL OF ACCUMULATION OF TIME FOR CHROMATOGRAPHY MASS SPECTROMETRY

PRIORITY

This application claims priority to UK Patent Application 1907220.6, filed on May 22, 2019, and titled "Dynamic Control of Accumulation Time for Chromatography Mass Spectrometry," by Christian Thoeing et al, which is hereby incorporated herein by reference in its entirety.

FIELD OF INVENTION

The present disclosure relates to mass spectrometry. In particular, the present disclosure relates to methods and systems for mass spectrometry including a Fourier Transform mass spectrometer or a Time of Flight mass spectrometer.

BACKGROUND TO THE INVENTION

Some mass analysers may employ image current detection of ions in order to analyse a sample of ions. In particular, some mass analysers may employ Fourier transformation of the detected image current to determine the frequency and/or mass spectrum of the ions. Such mass analysers are commonly known as Fourier Transform mass analysers. Fourier transform mass analysers generally include an ion trapping device for trapping a packet of ions as part of the mass analysis. It may be desirable to control the ion population within the ion trapping device in order to limit space charge effects Some mass analysers may measure a time of flight of a sample of ions in order to analyse the ions. Such mass analysers are commonly known as Time of Flight (TOF) mass analysers. TOF mass analysers generally include an ion trapping device to accumulate a packet of ions for injection into the TOF mass analyser. It may be desirable to control the ion population within the ion trapping device in order to limit space charge effects.

The ion population to be accumulated in an ion trapping device of a mass analyser may be controlled using an automatic gain control (AGC) system. For example, an AGC system as described in U.S. Pat. No. 5,107,109 may be used to control ion population in an ion trap. In particular, an AGC system may try to control the accumulation of ions in an ion trap such that the number of ions (ion population) does not reach a level where space charge effects become significant. AGC systems may aim to control the duration, per packet, over which ions are injected from an ion source and accumulated in the ion trap to try to ensure that the ion population per packet is generally consistent.

Mass analysers such as Fourier transform mass analysers, and TOF mass analysers may be used to analyse samples provided by a chromatography system. Chromatography systems are particularly useful for analysing complex samples comprising a number of different analyte molecules. When an analyte molecule elutes from a chromatography system, the rate at which an analyte molecule is output by the chromatography system may vary over the duration of a chromatographic peak. For example, the rate at which a sample analyte elutes from a chromatographic system may change significantly over the duration of the chromatographic peak from a negligible value, to a peak flow rate, and back again to a negligible value.

The variation in the rate at which analyte ions are provided to an ion trapping device of a Fourier Transform mass analyser or a TOF mass analyser presents a challenge for AGC systems. Where the flow rate of analyte ions to an ion trapping device is very low (e.g. negligible), it may take a significant period of time to accumulate the desired number of ions in the ion trap. Accordingly, where the rate of ions supplied to the ion trapping device is relatively low, the accumulation duration for an ion trapping device to reach a desired ion population may be relatively high.

In some known AGC systems, the AGC system may include an upper limit on the time taken to accumulate ions in an ion trapping device. For example, at the start of a mass analysis experiment, a user may predetermine a maximum injection time for an ion trapping device. The maximum injection time places an upper limit on the duration in which ions are injected into the ion trapping device prior to scanning by the mass analyser (i.e. the duration spent accumulating an ion packet in the ion trapping device). So, if the flow rate of analyte ions (e.g. from a chromatography system) is relatively low or negligible, the AGC system may terminate the accumulation of ions once the maximum injection time is reached. Accordingly, the maximum injection time of and AGC system may ensure that a minimum scan rate for the mass analyser is effectively predetermined by a user at the start of each experiment.

SUMMARY OF INVENTION

According to a first aspect of the disclosure, a method of mass spectrometry is provided. The method comprises:
 (a) eluting a sample from a chromatography system;
 (b) calculating a desired maximum scan duration for the sample eluting from the chromatographic system based on an expected duration of a chromatographic peak of the sample as it elutes from the chromatography system, and a minimum number of scans to be performed per chromatographic peak;
 (c) calculating a maximum accumulation duration based on the desired maximum scan duration;
 (d) ionising the sample to produce sample ions using an ion source;
 (e) directing the sample ions along an ion path from the ion source to a mass analyser;
 (f) performing a first set of mass analysis scans, each of the first set of mass analysis scans comprising: accumulating a portion of sample ions at a point along the ion path, wherein the portion of sample ions are accumulated for a duration not exceeding the maximum accumulation duration; and
 mass analysing the portion of sample ions using the mass analyser.

In some embodiments, the mass analyser may be a Fourier Transform mass analyser or a Time of Flight mass analyser, or an ion trap mass analyser.

Advantageously, the method according to the first aspect performs a first set of mass analysis scans using a mass analyser (which in some embodiments may be a Fourier Transform mass analyser or a Time of Flight (ToF) mass analyser). For each of the scans of the first set of scans, a portion of the sample ions are accumulated at a point along the ion path between the ion source and the mass analyser. For example, for a ToF, a portion of ions may be accumulated in an ion trapping device which subsequently injects ion packets into the ToF. For a Fourier Transform mass analyser such as an orbital trapping mass analyser, the portion of ions may be accumulated in the orbital trapping mass analyser prior to scanning. As such, the sample ions may be accumulated in an ion trapping device which is separate to the mass analyser, or the sample ions may be accumulated in the mass analyser.

As discussed above, the rate at which the sample (i.e. sample molecules) elutes from the chromatography system may vary over several orders of magnitude. Consequently, the rate at which sample ions may be accumulated will vary over the duration of the chromatographic period. In order to characterise a chromatographic peak of a sample as it elutes from a chromatographic system, it is desirable to perform a minimum number of scans over the duration of the chromatographic peak. Thus, the method according to the first aspect of the disclosure determines a desired maximum scan duration for the first set of scans to be performed based on an expected duration of the chromatographic peak, and the minimum number of scans to be performed. Based on this determination, the method then sets a maximum accumulation duration based on the desired maximum scan duration. The maximum accumulation duration places an upper limit on the time spent accumulating each portion of ions to be analysed by the mass analyser such that the first set of mass analysis scans is performed at a minimum rate sufficient to characterise the chromatographic peak, but not significantly higher than such a rate. Thus, the method according to the first aspect provides a way of controlling a maximum accumulation duration (a maximum injection time) for a controller of a mass spectrometer which takes into account variations in the sample flow rate.

As noted above, the rate at which the first set of scans is performed is not significantly higher than the rate sufficient to provide the desired minimum number of scans over the duration of the chromatographic peak. Thus, according to the method of the first aspect, the first set of mass analysis scans may be performed with a maximum accumulation time being as long as possible in order to try maximise the number of sample ions accumulated in mass analysis scans which have their duration limited by the maximum accumulation time.

The method of the first aspect may be particularly useful for the analysis of complex samples in which a number of target analytes are to be identified. In some embodiments, the method may be set up to identify one target analyte over the duration of the chromatographic peak.

In some embodiments, a plurality of target analytes to be identified may elute over the duration of an experiment. In some experiments, the plurality of target analytes to be identified may elute at different times (i.e. distinct chromatographic peaks). Thus, the method of the first aspect may determine a suitable maximum accumulation time for the duration of the experiment. In some other experiments, a plurality of target analytes may elute during the same chromatographic peak, or a plurality of chromatographic peaks of different target analytes may overlap in time. Thus, in some embodiments, the method of the first aspect may also calculate the desired maximum scan duration based on a number of target analytes to be identified in the sample currently eluting from the chromatography system. Accordingly, the method of the first aspect may dynamically update the desired maximum scan duration (and the maximum accumulation time) over the duration of an experiment to reflect changes in the number of target analytes to be identified at a given time, thereby ensuring that a minimum number of scans are performed over the duration of the chromatographic peak for each of the target analytes.

In some embodiments, the mass analyser may be configured to analyse more than one target analyte per mass analysis scan. As such, the mass analyser may be capable of multiplexing the analysis of a plurality of target analytes. Thus, in some embodiments, variations in the number of target analytes eluting from the chromatography system may be accounted for by multiplexing the analysis of one or more target analytes per mass analysis scan. In some embodiments, performing a mass analysis scan to identify more than one target analyte may increase the time taken to perform the mass analysis scan. Thus, in some embodiments, the method may account for variations in the time taken to perform the mass analysis scan due to multiplexing, by adjusting the maximum accumulation duration accordingly. As such, in some embodiments, the maximum accumulation duration is also calculated based a number of target analytes to be identified per mass analysis scan. Accordingly, the method may try to ensure that mass analysis scans are performed with the desired scan duration whilst taking into account any changes in the amount of multiplexing over the duration of an experiment.

In some embodiments, the method may take into account the number of target analytes to be identified in the sample currently eluting from the chromatography system, and the number of target analytes to be identified per mass analysis scan. The number of target analytes to be identified per mass analysis scan may be fixed, either by a user setting, or by a physical limitation of the mass analyser. For example, a mass analyser may be configured to identify no more than three target analytes per mass analysis scan. In experiments where the number of target analytes to be identified in the sample currently eluting from the chromatography system does not exceed the number of target analytes to be identified per mass analysis scan, the desired maximum scan duration is calculated in accordance with the first aspect. Where the number of the number of target analytes to be identified in the sample currently eluting from the chromatography system does exceed the number of target analytes to be identified per mass analysis scan, at least one further mass analysis scan will need to be performed to analyse all the target analytes. Thus, the method may update the desired maximum scan duration to ensure that the desired number of mass analysis scans are being performed over the duration of a chromatographic peak for each target analyte. As such, in some embodiments, the method may calculate a desired maximum scan duration for the sample eluting from the chromatographic system based on a duration of a chromatographic peak of the sample as it elutes from the chromatography system, a number of target analytes to be identified in the sample currently eluting from the chromatography system, a minimum number of scans per chromatographic peak to be performed, and the number of target analytes to be identified per mass analysis scan.

In some embodiments, the method of mass spectrometry according to the first aspect may further comprise:
  (g) calculating an average scan duration for the first set of mass analysis scans, wherein, if the average duration of the first set of scans is greater than the desired maximum scan duration, reducing the maximum accumulation duration to provide an adjusted maximum accumulation duration; and
  (h) performing a second set of mass analysis scans, each of the second set of mass analysis scans comprising;
    accumulating a portion of sample ions at a point along the ion path, wherein the portion of ions are accumulated for a duration not exceeding the adjusted maximum accumulation duration; and
    mass analysing the portion of sample ions using the mass analyser.

As will be appreciated by the skilled person, a duration for performing a mass analysis scan may be influenced by the time taken to accumulate a portion of sample ions (a packet of sample ions), time invariant overheads, and variable overheads. As discussed above, the time taken to accumulate a portion of sample ions may depend on the sample ion flow rate from the sample ion source, and the maximum accumulation duration. The time invariant analyser overheads include fixed duration processes which may be carried out during each mass analysis scan. For example, time invariant overheads include fixed time processes which are performed each scan, such as a fixed time period for the mass analyser to perform the scan and analyse the data. Variable overheads include processes of variable time and/or variable frequency (i.e. not performed every scan). Examples of variable overheads may include: pre-scans performed by the mass analyser, polarity switching processes, switching of external electric field sources etc.

In some embodiments, the possible presence of variable overheads whilst performing a set of mass analysis scans makes it challenging to accurately determine a maximum accumulation duration at the start of the first set of scans which will result in a scan duration not exceeding the desired maximum scan duration. Thus, according to step (g), the method may check to see if the maximum accumulation duration calculated in step (b) (i.e. an initial prediction) results in the first set of scan being performed within the desired duration. Often, the first set of scans may include one or more scans performed at the start of a chromatographic peak such that the maximum accumulation duration criteria may be reached. Thus, it is possible that the average duration of the first set of scans may be close to the desired maximum duration. In some cases, due to the presence of time variable overheads, the average duration of the first set of scans may exceed the desired maximum scan duration. As such, the method may determine that the first set of scans are not being performed at a rate sufficient to provide a minimum number of scans over the duration of the chromatographic peak.

To try to adjust the rate at which scans are performed, the method may calculate an adjusted maximum accumulation duration by reducing the maximum accumulation duration. The method then proceeds to perform a second set of mass analysis scans with the adjusted maximum accumulation duration. Accordingly, the second set of scans may be performed with an average scan duration which is shorter than the first set of scans, thereby increasing the number of scans performed over the duration of the chromatographic peak.

The invention according to the first aspect includes a plurality of lettered steps. It will be appreciated that where possible these steps may be performed simultaneously or concurrently.

According to a second aspect of the invention, a mass spectrometer for mass analysing a sample is provided. The mass spectrometer comprises an ion source configured to ionise a sample supplied from a chromatography apparatus, a mass analyser, an ion transport device configured to direct sample ions from the ion source to the mass analyser along an ion path, and a controller. The controller is configured to:
(i) calculate a desired maximum mass analysis scan duration based on a duration of a chromatographic peak of the sample as it elutes from the chromatography system, and a minimum number of scans per chromatographic peak to be performed;
(ii) calculate a maximum accumulation duration based on the desired maximum scan duration;
(iii) cause the ion source to ionise the sample to produce sample ions using an ion source;
(iv) cause the ion optics to direct the sample ions along the ion path from the ion source to a mass analyser;
(v) to cause the mass spectrometer to perform a first set of mass analysis scans, each of the first set of mass analysis scans comprising:
accumulating a portion of sample ions at a point along the ion path,
wherein the portion of sample ions are accumulated for a duration not
exceeding the maximum accumulation duration; and
mass analysing the portion of sample ions using the mass analyser.

In some embodiments, the mass analyser may be a Fourier Transform mass analyser, a Time of Flight mass analyser, or an ion trap mass analyser.

Accordingly, the second aspect of the invention provides a mass spectrometer which can implement methods according to the first aspect of the disclosure. Thus, the second aspect of the invention may incorporate any of the optional features and any associated advantages of the first aspect apply equally to the corresponding apparatus features of the second aspect. The controller of the second aspect is configured to perform a number of numbered steps. It will be appreciated that where possible these steps may be performed simultaneously or concurrently.

BRIEF DESCRIPTION OF THE DRAWINGS

The invention may be put into practice in a number of ways and a specific embodiment will now be described by way of example only and with reference to the Figures in which.

DETAILED DESCRIPTION OF EMBODIMENTS

Herein the term mass may be used to refer to the mass-to-charge ratio, m/z.

Figure 1:
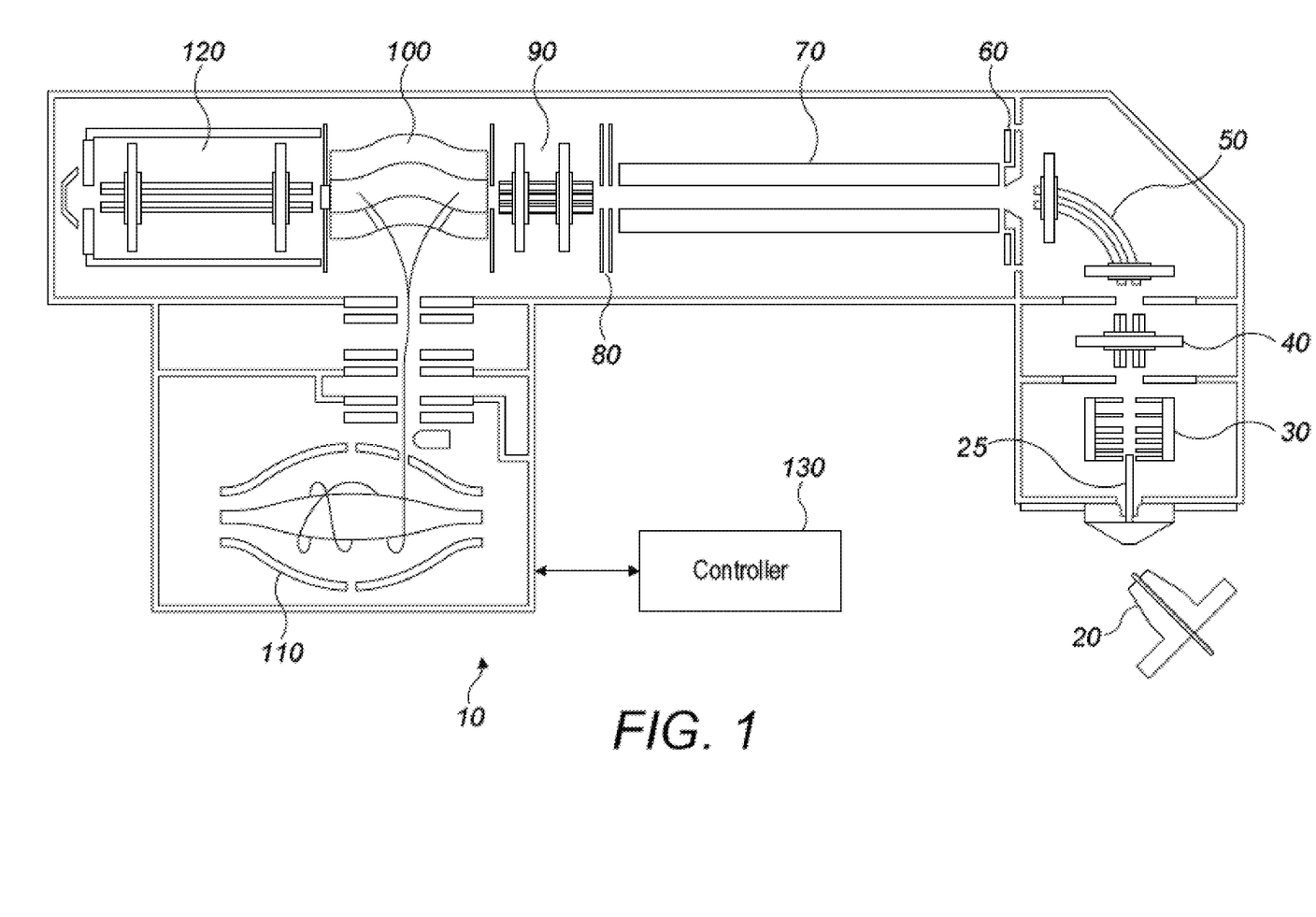
FIG. 1 shows a schematic arrangement of a mass spectrometer suitable for carrying out methods in accordance with embodiments of the present invention.

FIG. 1 shows a schematic arrangement of a mass spectrometer 10 suitable for carrying out methods in accordance with embodiments of the present invention. The arrangement of FIG. 1 represents, schematically, the configuration of the Q-Exactive® mass spectrometer from Thermo Fisher Scientific, Inc.

In FIG. 1, a sample to be analysed is supplied (for example from an autosampler) to a chromatographic apparatus such as a liquid chromatography (LC) column (not shown in FIG. 1). One such example of an LC column is the Thermo Fisher Scientific, Inc ProSwift monolithic column which offers high performance liquid chromatography (HPLC) through the forcing of the sample carried in a mobile phase under high pressure through a stationary phase of irregularly or spherically shaped particles constituting the stationary phase. In the HPLC column, sample molecules elute at different rates according to their degree of interaction with the stationary phase.

A chromatograph may be produced by measuring over time the quantity of sample molecules which elute from the HPLC column using a detector (for example a mass spectrometer). Sample molecules which elute from the HPLC column will be detected as a peak above a baseline measurement on the chromatograph. Where different sample molecules have different elution rates, a plurality of peaks on the chromatograph may be detected. Preferably, individual sample peaks are separated in time from other peaks in the chromatogram such that different sample molecules do not interfere with each other.

On a chromatograph, a presence of a chromatographic peak corresponds to a time period over which the sample molecules are present at the detector. As such, a width of a chromatographic peak is equivalent to a time period over which the sample molecules are present at a detector. Preferably, a chromatographic peak has a Gaussian shaped profile, or can be assumed to have a Gaussian shaped profile. Accordingly, a width of the chromatographic peak can be determined based on a number of standard deviations calculated from the peak.

For example, a peak width may be calculated based on 4 standard deviations of a chromatographic peak. Alternatively, a peak width may be calculated based on the width at half the maximum height of the peak. Other methods for determining the peak width known in the art may also be suitable. As such, the MS1 data acquired according to the method of the invention thus provides a mass-chromatogram of the sample eluted from the column.

The sample molecules thus separated via liquid chromatography are then ionized using an electrospray ionization source (ESI source) 20 which is at atmospheric pressure. Sample ions then enter a vacuum chamber of the mass spectrometer 10 and are directed by a capillary 25 into an RF-only S lens 30. The ions are focused by the S lens 30 into an injection flatapole 40 which injects the ions into a bent flatapole 50 with an axial field. The bent flatapole 50 guides (charged) ions along a curved path through it whilst unwanted neutral molecules such as entrained solvent molecules are not guided along the curved path and are lost.

An ion gate (TK lens) 60 is located at the distal end of the bent flatapole 50 and controls the passage of the ions from the bent flatapole 50 into a downstream quadrupole mass filter 70. The quadrupole mass filter 70 is typically but not necessarily segmented and serves as a band pass filter, allowing passage of a selected mass number or limited mass range whilst excluding ions of other mass to charge ratios (m/z).

Ions then pass through a quadrupole exit lens/split lens arrangement 80 and into a transfer multipole 90. The transfer multipole 90 guides the mass filtered ions from the quadrupole mass filter 70 into a curved trap (C-trap) 100. The C-trap 100 has longitudinally extending, curved electrodes which are supplied with RF voltages and end caps that to which DC voltages are supplied. The result is a potential well that extends along the curved longitudinal axis of the C-trap 100. In a first mode of operation, the DC end cap voltages are set on the C-trap so that ions arriving from the transfer multipole 90 are accumulated in the potential well of the C-trap 100, where they are cooled. Cooled ions reside in a cloud towards the bottom of the potential well and are then ejected orthogonally from the C-trap 100 towards the mass analyser 110.

The number of the ions accumulated in the C-trap 100 (i.e. the ion population) determines the number of ions that is subsequently ejected from the C-trap 100 into the mass analyser 110. The C-trap 90 may eject ions as a packet of ions into the mass analyser 110.

In order to control the accumulation of ions in the C-trap 100, the controller 130 may include an Automatic Gain Control (AGC) portion which is configured to control the number of ions in each packet ejected from the C-trap 100 into the mass analyser 110. In particular, the AGC portion of the controller may aim to prevent the number of ions in a packet exceeding an upper limit to avoid space charge effects. In order to control the number of ions in a packet, the AGC portion of the controller 130 may control the duration the C-trap 100 accumulates ions for. Further information regarding AGC systems suitable for use with a C-trap 100 and orbital trapping mass analyser 110 may be found in US 2016/0233078. To ensure that the AGC portion of the controller does not accumulate ions for extended period of time when the rate of sample ions provided to the C-trap 100 is relatively low, the controller 130 is also configured to place an upper limit on the duration over which the C-trap 1000 may accumulate sample ions for each packet. This upper limit is the maximum accumulation duration for the mass spectrometer of FIG. 1.

In some embodiments, the time spent injecting sample ions from the transfer multipole 90 into the C-trap 100 (i.e. an injection time) may also be considered to be the time spent accumulating ions in the C-trap 100. As such, a maximum injection time setting for a mass spectrometer may be considered to be a setting which controls a maximum accumulation duration for the ion trapping device (C-trap 100) into which the ions are injected.

Accordingly, a controller 130 may control the duration over which ions are accumulated in the C-trap 100 in order to control the ion population to be analysed by the mass analyser. In some embodiments, the accumulation duration of ions in the C-trap 100 may be a rate limiting step for performing a mass analysis scan.

As shown in FIG. 1, the mass analyser 110 is an orbital trapping mass analyser 110 such as the Orbitrap® mass analyser sold by Thermo Fisher Scientific, Inc. The orbital trapping mass analyser 110 has an off centre injection aperture and the ions are injected into the orbital trapping device 110 as coherent packets, through the off centre injection aperture. Ions are then trapped within the orbital trapping mass analyser 110 by a hyperlogarithmic electric field, and undergo back and forth motion in a longitudinal direction whilst orbiting around the inner electrode.

The axial (z) component of the movement of the ion packets in the orbital trapping mass analyser 110 is (more or less) defined as simple harmonic motion, with the angular frequency in the z direction being related to the square root of the mass to charge ratio of a given ion species. Thus, over time, ions separate in accordance with their mass to charge ratio.

Ions in the orbital trapping mass analyser 110 are detected by use of an image detector (not shown in FIG. 1) which produces a "transient" in the time domain containing information on all of the ion species as they pass the image detector. The transient is then subjected to a Fast Fourier Transform (FFT) resulting in a series of peaks in the frequency domain. From these peaks, a mass spectrum, representing abundance/ion intensity versus m/z, can be produced.

In the configuration described above, the sample ions (more specifically, a subset of the sample ions within a mass range of interest, selected by the quadrupole mass filter) are analysed by the orbital trapping mass analyser 110 without fragmentation. The resulting mass spectrum is denoted MS1.

MS/MS (or, more generally, MS$^n$) can also be carried out by the mass spectrometer 10 of FIG. 1. To achieve this, precursor sample ions are generated and transported to the quadrupole mass filter 70 where a subsidiary mass range is selected. The ions that leave the quadrupole mass filter 70 are again cooled in the C trap 100 but are then ejected in an axial direction towards a fragmentation chamber or cell 120. The fragmentation chamber 120 is, in the mass spectrometer 10 of FIG. 1, a higher energy collisional dissociation (HCD) device to which a collision gas is supplied. Precursor ions arriving into the fragmentation chamber 120 are bombarded with high energy collision gas molecules resulting in fragmentation of the precursor ions into fragment ions. The fragment ions are then ejected from the fragmentation chamber 120 back towards the C-trap 100, where they are once again trapped and cooled in the potential well. Finally the fragment ions trapped in the C-trap are ejected orthogonally towards the orbital trapping device 110 for analysis and detection. The resulting mass spectrum of the fragment ions is denoted MS2.

Although an HCD fragmentation chamber 120 is shown in FIG. 1, other fragmentation devices may be employed instead, employing such methods as collision induced dissociation (CID), electron capture dissociation (ECD), electron transfer dissociation (ETD), photodissociation, and so forth.

The "dead end" configuration of the fragmentation chamber 120 in FIG. 1, wherein precursor ions are ejected axially from the C-trap 100 in a first direction towards the fragmentation chamber 120, and the resulting fragment ions are returned back to the C-trap 100 in the opposite direction, is described in further detail in WO-A-2006/103412.

The mass spectrometer 10 is under the control of a controller 130 which, for example, is configured to control the timing of ejection of the trapping components, to set the appropriate potentials on the electrodes of the quadrupole etc so as to focus and filter the ions, to capture the mass spectral data from the orbital trapping device 110, control the sequence of MS1 and MS2 scans and so forth. It will be appreciated that the controller 130 may comprise a computer that may be operated according to a computer program comprising instructions to cause the mass spectrometer to execute the steps of the method according to the present invention.

It is to be understood that the specific arrangement of components shown in FIG. 1 is not essential to the methods subsequently described. Indeed the methods described in this disclosure may be implemented on any controller for controlling the injection of ions into a Fourier Transform mass analyser, a TOF mass analyser, or an ion trap mass analyser.

Further, the skilled person will appreciate that the mass spectrometer 10 of FIG. 1 is one example of an apparatus in which ions are transported from an ion source (ESI source 20) to a mass analyser (110) an ion transport device. As such, in the embodiment of FIG. 1 the capillary 25, the S lens 30, the injection flatapole 40, the bent flatapole 50, the ion gate 60, the quadrupole mass filter 70, the exit lens/split lens arrangement 80, the transfer multipole 90, and the C-trap 100 are examples of ion transport devices. The ion transport devices are configured to transport sample ions from the ESI ion source 20 to the mass analyser 110. In other embodiments, other configurations of ion transport device(s) may be used to transport ions from an ion source to a mass analyser.

An exemplary embodiment of the method will now be described with reference to FIGS. 2 and 3, in which sample molecules are supplied from a liquid chromatography (LC) column as part of the exemplary apparatus described above (as shown in FIG. 1).

According to embodiments of the invention, the controller 130 may calculate a desired maximum scan duration (D) based on input information regarding the experiment to be performed. The input information includes an expected chromatographic peak duration (W), the number of target analytes (N) to be analysed over the duration of the chromatographic peak, and the minimum number of mass analysis scans to be performed over the duration of a chromatographic peak (M).

Prior to commencement of an experiment, a user may specify one or more of the variables W, N and M. Alternatively, the controller 130 may look up suitable values for any of W, N, and/or M from a library of predetermined values based on the type of experiment to be performed. For example, a user may provide the controller 130 with information regarding a target analyte to be identified in the sample, and the controller 130 may select suitable values for W, N and M accordingly.

Based on the input information for W, N and M, the controller 130 is configured to calculate the desired maximum scan duration $D_{max}$. In some embodiments of the invention, the controller may calculate $D_{max}$ using the equation:

$$D_{max} = W/(M*N) \quad (1)$$

Based on the calculated desired maximum scan duration $D_{max}$, the controller 130 may then calculate a maximum accumulation time ($A_{max}$) for the accumulation of ions in the C-trap for each mass analysis scan.

In some embodiments, the controller 130 may determine $A_{max}$ based on $D_{max}$ and any time invariant overheads associated with performing a mass analysis scan. For example, time invariant overheads may include, the time taken to inject ions from the C-trap 100 into the mass analyser 110 or the time taken for the mass analyser to perform the mass analysis scan. In some embodiments, the C-trap 100 may be configured to accumulate a packet of ions for the next mass analysis scan in parallel with the mass analyser 110 performing a mass analysis scan (parallel acquisition). Accordingly, the time invariant overheads in some embodiments may be negligible relative to $D_{max}$. For example, in some embodiments, the controller 130 may determine $A_{max}$ to be substantially equal to $D_{max}$. In the embodiment of FIG. 1, the time invariant overheads may be about 10 ms. As such, the controller may calculate $A_{max}$ as $A_{max} = D_{max} - 0.01$ s (i.e. $D_{max}$ minus any time invariant overhead time).

In some embodiments, the mass analyser to be used for performing the mass analysis scans may have a minimum duration for performing a mass analysis scan. Thus, in some embodiments, although it may be possible to reduce the maximum accumulation time below such a minimum duration for performing a mass analysis scan, it may not be desirable to do this as this will not further increase the rate at which mass analysis scans are performed. Thus, in some embodiments, the controller 130 may include a minimum desired scan duration setting ($D_{min}$). In other embodiments, the controller may define a minimum accumulation time setting ($A_{min}$), below which the maximum accumulation time $A_{max}$ may not be reduced. In some embodiments, the relationship between $D_{MAX}$ and $A_{MAX}$ is fixed such that the limits $D_{min}$ and $A_{min}$ may be used interchangeably. For example, in the embodiment of FIG. 1 in which the C-trap 100 may be configured to accumulate a packet of ions for the next mass analysis scan in parallel with the mass analyser 110 performing a mass analysis scan, the parallel acquisition methodology may require a minimum amount of time per scan (i.e. the mass analyser 110 determines a value for $D_{min}$). Accordingly, the controller 130 may be configured to ensure that the C-trap 100 acquires ions for the minimum amount of time. In some embodiments, $D_{min}$ may be at least: 10 ms, 20 ms, 50 ms, 100 ms, or 150 ms, although the actual value may depend on the mass analyser being used. In the embodiment of FIG. 1, $D_{min}$ may be 128 ms.

The controller 130 may calculate $D_{max}$ and $A_{max}$, prior to the start of the experiment, or the controller 130 may calculate $D_{max}$ and $A_{max}$ during the experiment.

According to this disclosure, a mass analysis scan refers to an operation in which the mass analyser 110 is used to mass analyse a packet of ions to obtain a mass spectrum providing information regarding mass to charge ratios of the packet of ions. In some embodiments, an AGC portion of the controller 130 may also be configured to control the mass spectrometer 10 to perform other types of scan, which are not mass analysis scans. For example, the AGC may be configured to control the mass spectrometer 10 to perform on or more pre-scan during an experiment to obtain additional information for controlling the mass spectrometer 10.

According to the method the controller is 130 configured to cause the ESI ion source 20 to ionise sample molecules received from the LC column to produce sample ions. The controller is also configured to control the ion transport devices 25, 30, 40, 50, 60, 70, 80, 90 to direct the sample ions along the ion path from the ion source the C-trap 100 where the sample ions are accumulated.

When the rate of sample ions provided to the C-trap 100 is relatively high, the AGC portion of the controller 130 may control the duration over which ions are accumulated in the C-trap 100 to ensure that the ion population of each ion packet provided to the mass analyser 110 is relatively consistent. When the rate of sample ions provided to the C-trap 100 is relatively low, the C-trap 100 may accumulate ions for a duration up to the maximum accumulation duration $A_{max}$. Once the maximum accumulation duration is reached, the controller 130 is configured to eject the accumulated packet of ions into the mass analyser 110 so that the packet of ions can be scanned.

The mass analyser 110 analyses the packet of ions whilst the C-trap 100 accumulates the next packet of ions for mass analysis. Thus, in accordance with the method, the controller 130 is configured to control the mass spectrometer 10 to perform a first set of mass analysis scans. By ensuring that each of the mass analysis scans is performed with a maximum accumulation duration calculated based on the desired scan duration, the method may provide a scan frequency which is suitable for characterising a chromatographic peak of the sample.

In a further embodiment of the invention, the controller 130 may also be configured to account for any time variable overheads which may occur throughout the experiment. A graphical representation of the further embodiment is shown in FIG. 2. The experiment of FIG. 2 is performed on a mass spectrometer 10 as shown in FIG. 1. The graph of FIG. 2 shows the extracted ion current (XIC), the actual accumulation time, the maximum accumulation time set by the controller 130, and the actual mass analysis scan duration for each mass analysis scan performed during the experiment. The extracted ion current for each mass analysis scan is the extracted ion current measured by the orbital trapping mass analyser 110, which is representative of the magnitude of the ion population for each mass analysis scan.

Figure 2:
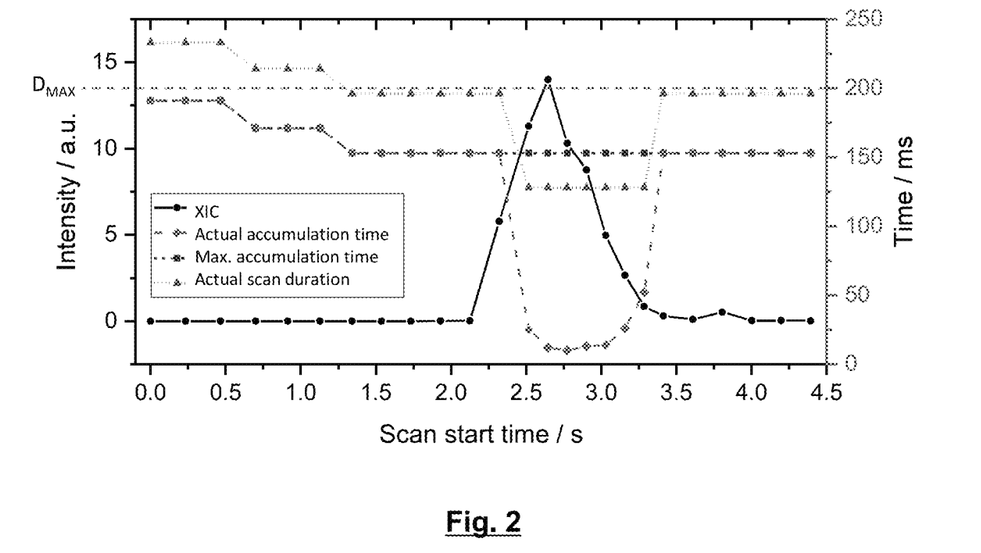
FIG. 2 shows is a graphical representation of the variation in maximum accumulation duration over the duration of a chromatographic peak according to an embodiment of the invention.

For the experiment shown in FIG. 2, a sample with a chromatographic peak width at FWHM (W) of 1 s is to be measured, with one target analyte to be identified (N=1). It is desired that at least 5 mass analysis scans are performed over the duration of the chromatographic peak (M=5). Accordingly, based on equation (1), as desired maximum scan duration $D_{max}$ may be calculated by the controller 130 as 200 ms. For the experiment to be performed, it may also be specified that the experimental apparatus results has time invariant overheads of 10 ms (e.g. to account for ion injection and scan time overheads). Thus, a maximum accumulation time $A_{max}$ for the first set of scans may be determined to be 190 ms. As shown in FIG. 2, the first three scans (a first set of scans) are performed with $A_{max}$=190 ms.

In some experiments, the first set of scans performed at the start of the experiment may have a relatively low flow rate of sample ions, thus resulting in the actual accumulation time for each of the first set of scans being about equal to the maximum accumulation time $A_{max}$. For example, as shown in the experiment of FIG. 2, the XIC for each of the first three scans is relatively low (about 0.1 a.u.). Consequently, taking into account any time invariant overheads and/or variable overheads, the average duration for the first set of scans may exceed the desired duration $D_{max}$.

According to the further embodiment, the controller 130 may be configured to calculate an average scan duration for the first set of mass analysis scans. If the average duration of the first set of scans is greater than the desired maximum scan duration, the controller is configured to reduce the maximum accumulation duration to provide an adjusted maximum accumulation duration ($A_{max}'$) for the C-trap. The controller 130 is then configured to cause the mass spectrometer 10 to perform a second set of mass analysis scans using the adjusted maximum accumulation duration.

According to the further embodiment, the controller 130 may calculate the average scan duration for the first set of mass analysis scans based on the first X mass analysis scans performed during the experiment, where X is at least 3. For example, X may be 3, 4, 5, or 7.

The controller 130 may calculate the adjusted accumulation duration by reducing $A_{max}$ by a predetermined amount. For example, the controller 130 may reduce $A_{max}$ by at least 1 ms. For example, in some embodiments, the controller 130 may reduce $A_{max}$ by 5 ms, 10 ms or 20 ms. In some embodiments, the controller 130 may reduce $A_{max}$ by a scaling factor k. As such, $A_{max}'=A_{max}*k$ where k<1. For example, k may be 0.99, 0.95, 0.9 or 0.8.

Thus, as shown in FIG. 2, the controller 130 determines that the maximum accumulation time chosen for the first set of scans is resulting in an average scan duration exceeding the desired scan duration. Accordingly, the controller 130 adjusts the maximum accumulation time in order to try to reduce the average scan duration for the second set of scans. As shown in FIG. 2, the controller calculates $A_{max}'$=190 ms*0.9=171 ms (i.e. k=0.9), such that an adjusted maximum accumulation time is provided.

Thus, a second set of mass analysis scans may be performed using the $A_{max}'$. As shown in FIG. 2, the XIC for mass analysis scans 4-6 remains about 0.1, such that each mass analysis scan accumulates sample ions up to the $A_{max}'$. Accordingly, the change in $A_{max}'$ results in a reduction of the average scan duration, thereby increasing the number of scans performed per chromatographic peak.

In some embodiments, the controller 130 may continue to monitor the average scan duration throughout the experiment and make further adjustments to the maximum injection time as required to try to ensure that the desired minimum number of mass analysis scans (M) criteria is met.

For example, when performing the second set of scans, the controller 130 may calculate an average scan duration for the previous n mass analysis scans. If the average duration of the previous n mass analysis scans is greater than the desired maximum scan duration, the controller may further reduce the adjusted maximum accumulation duration. For example, the controller may continue to reduce the adjusted maximum accumulation duration in a similar manner to the adjustments described above. For example, the controller 130 may reduce the adjusted maximum accumulation duration using the scaling factor k. The average scan duration for the previous n mass analysis scans may be the previous three scans of the second set of mass analysis scans (i.e. n=3). In some embodiments, n may be an integer which is at least: 2, 3, 4, 6. In some embodiments, n may be calculated based on the number of target analytes to be identified (N). For example, n may be determined by the controller as a multiple of N (i.e. n=jN, where j is at least 2, 3, 4, or 5). In particular, n may be determined by the controller 130 to be five times N.

In the embodiment of FIG. 2, n=3. Accordingly, after the first three mass analysis scans of the second set of scans (i.e. after mass analysis scan 6), the controller 130 calculates an average scan duration for the first three mass analysis scans of the second set of mass analysis scans (i.e. the fourth to sixth mass analysis scans shown in FIG. 2). As shown in FIG. 2, the average scan duration for mass analysis scans 4-6 remains above the desired scan duration. Accordingly, the maximum accumulation time for the mass analysis scan fourth mass analysis scan of the second set of mass analysis scans (i.e. the seventh scan) is further reduced.

Thus, as shown in FIG. 2 the maximum accumulation duration may be adjusted until the mass analysis scan duration falls below the desired maximum scan duration (or the average scan duration falls below the desired maximum scan duration). By continually adjusting the maximum accumulation time, the controller 130 may ensure that the number of mass analysis scans performed over the duration of a chromatographic peak is consistent with the desired setting M input by a user.

For some experiments, a sample comprising a plurality of target analyte molecules to be analysed may be mass analysed by the mass spectrometer 10. For such samples, the sample may elute from the chromatography system with a plurality of chromatographic peaks spread out over time, with each chromatographic peak potentially having different widths (i.e. W may vary per target analyte). Further, some target analyte molecules may elute from a chromatography system at the same time (or overlapping times), such that the number of target analyte molecules to be analysed at a point during the experiment may be greater than 1 (i.e. N≥1). Consequently, a single fixed maximum accumulation time (i.e. a fixed maximum injection time) may not be suitable for characterising all the chromatographic peaks present in the experiment.

In some embodiments, the controller 130 may be configured to dynamically adjust the maximum accumulation time throughout an experiment. As such, a method of mass spectrometry substantially as discussed above may be provided in which the sample eluting from the chromatography system comprises providing a plurality of chromatographic peaks of the sample over time. Accordingly, the controller 130 may be further configured to update the desired maximum scan duration ($D_{max}$) and the maximum accumulation duration ($A_{max}$) over time based on the chromatographic peaks eluting from the chromatography system. Information regarding each of the target analytes expected in the sample (e.g. associated chromatographic peak width W, time at which it is expected to elute (i.e. retention time for the chromatographic system)) may be provided by a user prior to the start of an experiment.

Figure 3:
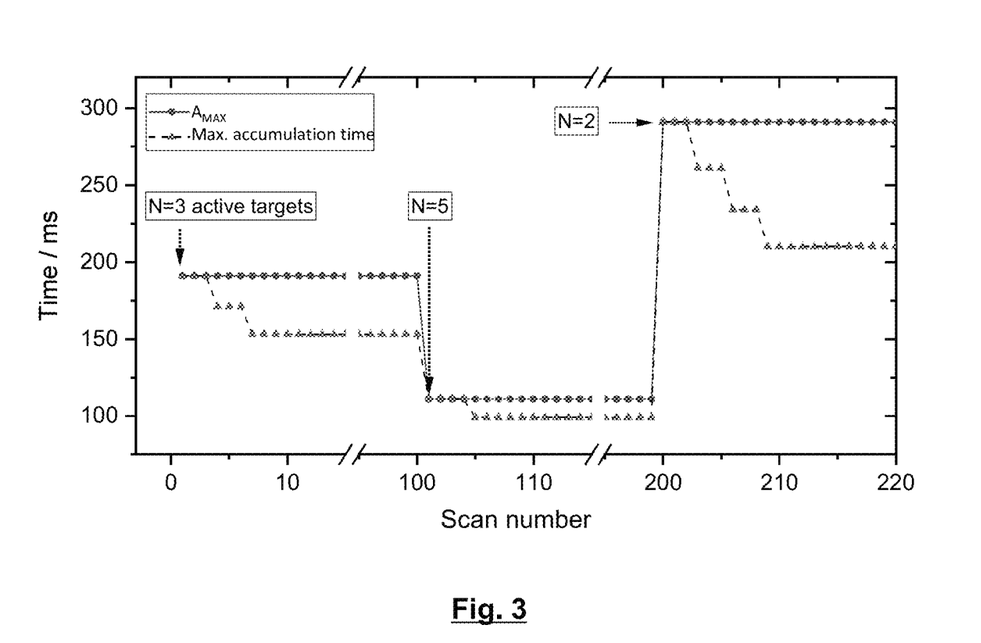
FIG. 3 shows a graphical representation of the variation in maximum accumulation duration for a mass analysis experiment including a plurality of chromatographic peaks according to an embodiment of the invention.

For example, FIG. 3 shows a further embodiment of the invention in which the desired maximum scan duration is initially calculated, and subsequently updated (twice) over the duration of an experiment in order to analyse a plurality of chromatographic peaks.

A user may provide the controller with a configuration file comprising input information for the mass spectrometry experiment to be performed. The input information may include information identifying the target analytes to be identified during the experiment. For each target analyte to be identified, the input information may specify a mass to charge ratio of the target analyte and chromatography retention time information for the target analyte. The configuration file may also specify an expected chromatographic peak width W for the target analytes to be identified. The peak width may be specified per target analyte, or a global value may be provided for all target analytes (i.e. the same value of W is used for all target analytes).

The chromatography retention time information for each target analyte may include information regarding an expected retention time for said target analyte in the chromatography apparatus connected to the mass spectrometer 1. Based on the expected retention time, the controller may determine when each target analyte is expected to be active (i.e. eluting from the chromatography apparatus) over the duration of the experiment.

In some embodiments, the chromatography retention time information may define a time period over which each target analyte is expected to elute from the chromatography apparatus. The time period may be defined by an analyte elution start time and an analyte elution end time. Some target analytes may be specified to be active over the entire duration of the experiment, in which case the chromatography retention time for said target analyte may not include an analyte elution start time and analyte elution end time.

For example, chromatography information for three target analytes may comprise:

TABLE 1

| m/z of target analyte | Analyte elution start time (s) | Analyte elution end time (s) |
|---|---|---|
| 240.115 | 87 | 99 |
| 477.2303 | 108 | 119 |
| 314.115 | 80 | 93 |

Based on the chromatography retention time information for each target analyte, the controller 130 may determine the number of target analytes to be identified in the sample (N) at a given point in the experiment. As such, the controller may update the value N based on the number of target analytes expected to be active at a point in the experiment, based on the chromatography retention time information. Following an update to the number of target analytes N, the controller 130 may recalculate the desired maximum mass analysis scan duration $D_{MAX}$ (and subsequently $A_{MAX}$ and $A_{MAX}{}'$ according to the methods described above) to reflect the change in the experiment. As such, the controller 130 may dynamically update the maximum accumulation duration for performing mass analysis scans over the course of the experiment.

For example, in for the three target analytes shown in Table 1 above, at time t=82 s, the controller 130 may determine that one target analyte is currently active (N=1). At time t=90, the controller 130 may determine that two target analytes are currently active (N=2). The controller 130 may the update then repeat a method for determining a maximum accumulation time ($A_{MAX}$ or $A_{MAX}{}'$) according to embodiments of this disclosure. Each time the desired maximum mass analysis scan duration $D_{MAX}$ is recalculated, the controller 130 may be configured to repeat the scaling process for adjusting $A_{MAX}{}'$.

In some embodiments of the disclosure, the controller 130 may also be configured to only update the maximum accumulation duration setting if a change in the number of active targets (N) exceeds a threshold value. For example, the controller 130 may be configured to update the maximum accumulation duration in response to a change in the value of N which is at least 20% of the current value. In other embodiments, the threshold for updating $D_{MAX}$ may be at least: 25%, 30%, 35%, 40% or 50% of the current value of N For example, FIG. 3 shows a graph of $A_{MAX}$ and $A_{MAX}{}'$ over the course of an experiment in which the number of active targets (N) changes over the duration of the experiment. The threshold for updating $D_{MAX}$ is at least 35% of the current value of N. As shown in FIG. 3, at the start of the experiment, N is determined to be 3. Over the first 6 scans of the experiment, a value for $A_{MAX}{}'$ is calculated which provides the desired number of mass analysis scans (M) over the duration of a chromatographic peak. Over scans 0 to 100, the number of active targets varies between 2 and 4, but due to the threshold, $D_{MAX}$ (and thus $A_{MAX}$) is not updated. Prior to performing scan 100, the controller 130 determines that N has increased to 5, which is above the threshold. Consequently, the controller 130 recalculates $D_{MAX}$ and $A_{MAX}$, and subsequently $A_{MAX}{}'$ using the new value for N. Thus, the controller may dynamically adjust the maximum accumulation duration to adapt to changes in the number of target analytes expected over the duration of an experiment. A further update to N is shown to occur at mass analysis scan number 200, where the controller determines that two target analytes are now active.

Figure 4:
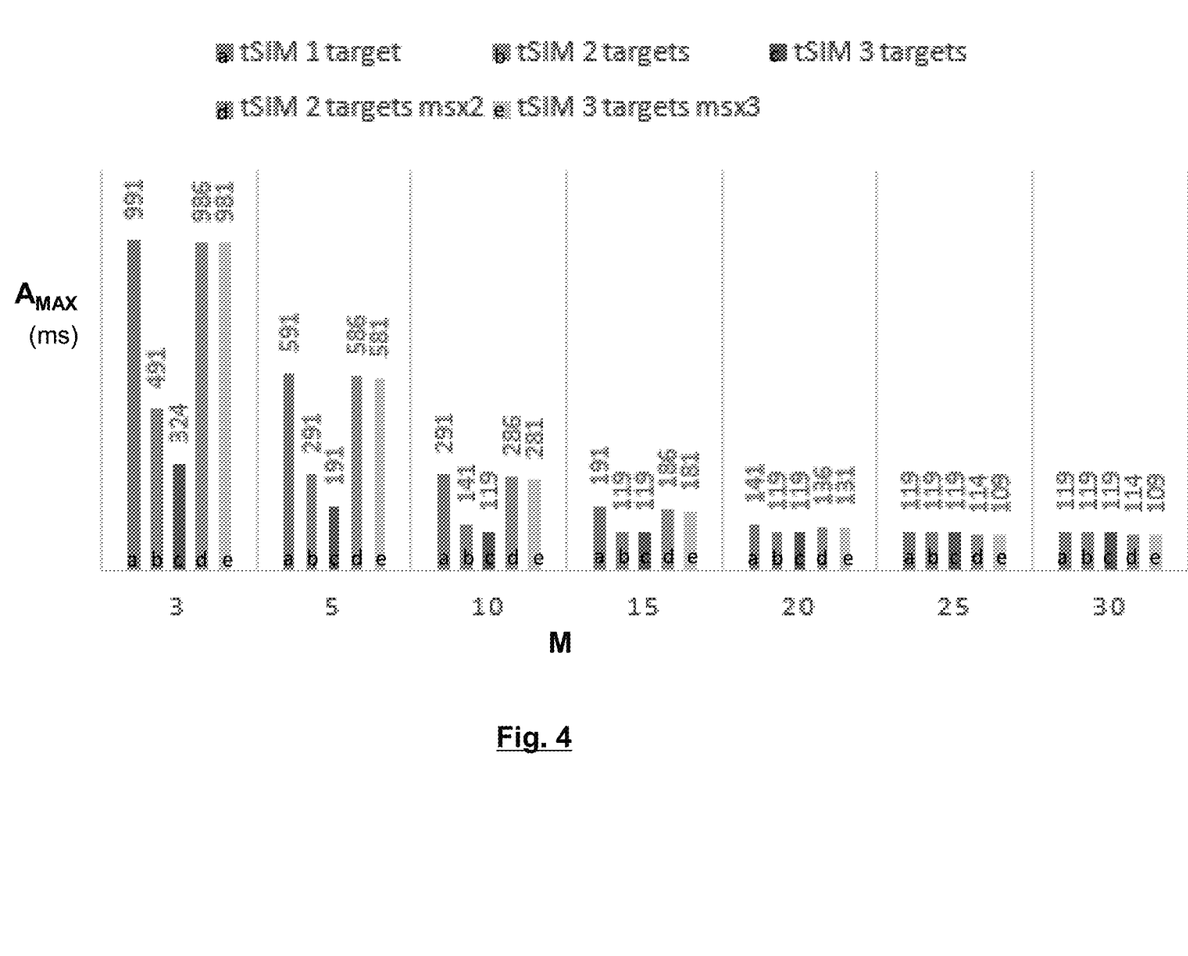
FIG. 4 shows how the maximum accumulation time $A_{max}$ may be calculated for the mass spectrometer of FIG. 1, depending on the type of experiment to be performed.

FIG. 4 provides a further graph showing how the maximum accumulation time $A_{max}$ may be calculated for the mass spectrometer of FIG. 1, depending on the type of experiment to be performed. For the experiments on FIG. 4, targeted single ion monitoring experiments are performed on a sample with a chromatographic peak width of 3 s. The mass spectrometer 10 has a minimum accumulation time of 128 ms.

In some embodiments, the mass analyser may be capable of analysing more than one target analyte per mass analysis scan. As such, the mass analyser may be configured to multiplex a mass analysis scans so that more than one (i.e. multiple) target analytes are analysed in a single mass analysis scan. The amount of multiplexing to be performed per mass analysis scan may be a number of target analytes to be identified per mass analysis scan.

For example, the mass analyser 110 of the mass spectrometer 10 may be capable of analysing at least 2 target analytes in a single mass analysis scan. The mass analyser 110 may also be configured to multiplex at least: 3, 4, 5 or 7 target analytes in a single mass analysis scan. The controller 130 may determine the number of target analytes to be analysed in a single mass analysis scan based on a configuration file providing information regarding the target analytes to be analysed during the experiment. Performing a multiplexed mass analysis scan my increase the time taken to perform the mass analysis scan. For example, each additional target analyte to be analysed per mass analysis scan may increase the time taken to perform the mass analysis scan by a fixed amount. Thus, for a given $D_{MAX}$, $A_{MAX}$ may be calculated to take into account any multiplexing performed. For example, some mass analysers capable of multiplexing mas analysis scans may have a time variable overhead of a per mass analysis scan. Thus, the maximum accumulation duration may be calculated as:

$$A_{MAX}=D_{MAX}-a*P$$

P is the number of target analytes to be analysed per mass analysis scan (i.e. the degree of multiplexing the mass analyser is capable of performing). For example, for the mass analyser 110 of FIG. 1, the time variable overhead a may be 5 ms. In other embodiments, a may be at least 1 ms, 5 ms, 10 ms, or 20 ms.

FIG. 4 shows a graph of 5 different single ion monitoring (SIM) experiments with different numbers of target analytes to be analysed concurrently (i.e. different N values), and different levels of multiplexing (P). For all the experiments, the chromatographic peak width W is 3 s, and each mass analysis scan has a time invariant overhead of 4 ms, and a time variable overhead of 5 ms to account for multiplexing (i.e. a=5 ms).

In experiment a), a single target analyte is analysed in a single mass analysis scan, with M=3. Consequently, the desired maximum scan duration calculated by the controller is 1000 ms. Taking into account overheads for performing the mass analysis scan, $A_{MAX}$ for experiment a) is 991 ms. As further shown in FIG. 4, increasing the number of target analytes (N) in experiments b) and c), without performing any multiplexing, resulting in a reduction of $D_{MAX}$ and consequently $A_{MAX}$. For example, $D_{MAX}$ for experiment c) when M=3 is 333 ms.

In experiments d) and e), multiplexing is performed to allow multiple target analytes to be analysed in a single mass analysis scan. As such, for experiment d), P=2, and for experiment e), P=3. Thus, for experiments d) and e), relative to experiment a), multiple target analytes can be analysed without needing to change $D_{MAX}$ (i.e. $D_{MAX}$ for experiments d) and e) when M=3 is 1000 ms).

FIG. 4 also shows the effect of increasing M for each of experiments a), b), c), d), and e). As M increases, the controller 130 adjusts $D_{MAX}$, and consequently $A_{MAX}$ to provide the desired minimum number of mass analysis scans per target analyte. The mass analyser of FIG. 4 has a minimum scan duration of $D_{min}$=128 ms (i.e. similar to the mass analyser 110 of FIG. 1 discussed above). Thus, as M increases the controller does not reduce $A_{MAX}$ below the limit set by $D_{min}$, as this would not further increase the rate at which scan are performed. For example, for experiment e) with M=25, W/M=3000/25=120 ms, which is below $D_{min}$. Thus, for experiment e) $D_{MAX}$ is set to 128 ms. $A_{MAX}$ is consequently calculated, taking account P=3, to be $D_{MAX}$-a*P-4 ms=109 ms.

In some experiments, the number of target analytes to be identified in the sample currently eluting from the chromatography system (N) may exceed the amount of multiplexing (P) the mass analyser is set to perform (or indeed capable of performing). Where such functionality is desired, the controller may be configured in some embodiments to account for this when calculating the desired maximum scan duration. For example, in some embodiments, the desired maximum scan duration may be calculated as:

$$D_{MAX} = W/(M*\text{ceil}(N/P))$$

The ceil( ) function is a ceiling function which returns the smallest integer that is bigger than or equal to N/P. Thus, the controller 130 may be configured to calculate the number of mass analysis scans (ceil (N/P)) required to analyse all the current target analytes to be analysed whilst taking into account the amount of multiplexing the mass analyser is currently set to perform (P).

Advantageously, the present invention may be used to provide a mass spectrometer and methods of mass spectrometry in which the maximum accumulation time is controlled during a mass analysis experiment in order to provide a user with a desired minimum number of mass analysis scans per chromatographic peak and target analyte.

Although preferred embodiments of the invention have been described herein in detail, it will be understood by those skilled in the art that variations may be made thereto without departing from the scope of the invention or of the appended claims.

The invention claimed is:

1. A method of mass spectrometry comprising:
   (a) eluting a sample from a chromatography system;
   (b) calculating a desired maximum scan duration for the sample eluting from the chromatographic system based on a duration of a chromatographic peak of the sample as it elutes from the chromatography system, and a minimum number of scans per chromatographic peak to be performed;
   (c) calculating a maximum accumulation duration based on the desired maximum scan duration;
   (d) ionising the sample to produce sample ions using an ion source;
   (e) directing the sample ions along an ion path from the ion source to a mass analyser;
   (f) performing a first set of mass analysis scans, each of the first set of mass analysis scans comprising:
      accumulating a portion of sample ions at a point along the ion path, wherein the portion of sample ions are accumulated for a duration not exceeding the maximum accumulation duration; and
      mass analysing the portion of sample ions using the mass analyser,
         wherein the mass analyser is a Fourier Transform mass analyser or a Time of Flight mass analyser.

2. A method according to claim 1, wherein the desired maximum scan duration is also calculated based on a number of target analytes to be identified in the sample currently eluting from the chromatography system.

3. A method according to claim 1, wherein the maximum accumulation duration is also calculated based a number of target analytes to be identified per mass analysis scan.

4. A method according to claim 3, wherein the desired maximum scan duration is also calculated based on the number of target analytes to be identified per mass analysis scan.

5. A method of mass spectrometry according to claim 1, further comprising:
   (g) calculating an average scan duration for the first set of mass analysis scans, wherein, if the average duration of the first set of scans is greater than the desired maximum scan duration, reducing the maximum accumulation duration to provide an adjusted maximum accumulation duration; and
   (h) performing a second set of mass analysis scans, each of the second set of mass analysis scans comprising;
      accumulating a portion of sample ions at a point along the ion path, wherein the portion of ions are accumulated for a duration not exceeding the adjusted maximum accumulation duration; and
      mass analysing the portion of sample ions using the mass analyser.

6. A method of mass spectrometry according to claim 5, wherein the maximum accumulation duration is reduced by a scaling factor to provide the adjusted maximum accumulation duration.

7. A method of mass spectrometry according to claim 5, wherein performing the second set of mass analysis scans further comprises:
   calculating an average scan duration for the previous n mass analysis scans, wherein, if the average duration of the previous n mass analysis scans is greater than the desired maximum scan duration, further reducing the adjusted maximum accumulation duration, wherein n is an integer greater than 2.

8. A method of mass spectrometry according to claim 7, wherein the step of calculating the average scan duration for the previous n mass analysis scans and further reducing the adjusted maximum accumulation duration if the average duration of the previous n mass analysis scans is greater than the desired maximum scan duration is repeated during the performing of the second set of mass analysis scans.

9. A method of mass spectrometry according to claim 7, wherein n is calculated based on a multiple of the number of target analytes to be identified.

10. A method of mass spectrometry according to claim 1, wherein:
    eluting the sample from the chromatography system comprises providing a plurality of chromatographic peaks of the sample over time; and
    the desired maximum scan duration and the maximum accumulation duration are updated over time based on the chromatographic peaks eluting from the chromatography system.

11. A method of mass spectrometry according to claim 1 wherein the mass analyser is an orbital trapping mass analyser.

12. A mass spectrometer for mass analysing a sample, comprising:
    an ion source configured to ionise a sample supplied from a chromatography apparatus;
    a mass analyser, wherein the mass analyser is a Fourier Transform mass analyser or a Time of Flight mass analyser;
    an ion transport device configured to direct sample ions from the ion source to the mass analyser along an ion path;
    a controller configured to:
       (i) calculate a desired maximum mass analysis scan duration based on a duration of a chromatographic peak of the sample as it elutes from the chromatography system, and a minimum number of scans per chromatographic peak to be performed;
       (ii) calculate a maximum accumulation duration based on the desired maximum scan duration;
       (iii) cause the ion source to ionise the sample to produce sample ions using an ion source;

(iv) cause the ion optics to direct the sample ions along the ion path from the ion source to a mass analyser;

(v) to cause the mass spectrometer to perform a first set of mass analysis scans, each of the first set of mass analysis scans comprising:

accumulating a portion of sample ions at a point along the ion path, wherein the portion of sample ions are accumulated for a duration not exceeding the maximum accumulation duration; and mass analysing the portion of sample ions using the mass analyser.

13. A mass spectrometer according to claim 12, wherein the desired maximum scan duration is also calculated based on a number of target analytes to be identified in the sample.

14. A mass spectrometer according to claim 12, wherein the maximum accumulation duration is also calculated based a number of target analytes to be identified per mass analysis scan.

15. A mass spectrometer according to claim 14, wherein the desired maximum scan duration is also calculated based on the number of target analytes to be identified per mass analysis scan.

16. A mass spectrometer according to claim 12, including an ion trapping device, wherein each portion of ions are accumulated in the ion trapping device at a point along the ion path.

17. A mass spectrometer according to claim 12, wherein the controller is further configured to:

(vi) calculate an average scan duration for the first set of mass analysis scans, wherein, if the average duration of the first set of scans is greater than the desired maximum scan duration, the controller is configured to reduce the maximum accumulation duration to provide an adjusted maximum accumulation duration; and (vii) to cause the mass spectrometer to perform a second set of mass analysis scans, each of the second set of mass analysis scans comprising;

accumulating a portion of sample ions at a point along the ion path, wherein the portion of ions are accumulated for a duration not exceeding the adjusted maximum accumulation duration; and mass analysing the portion of sample ions using the mass analyser.

18. A mass spectrometer according to claim 17, wherein the controller is configured to reduce the maximum accumulation duration by a scaling factor to provide the adjusted maximum accumulation duration.

19. A mass spectrometer according to claim 17, wherein the controller is configured to perform the second set of mass analysis scans further comprising:

calculating an average scan duration for the previous n mass analysis scans, wherein, if the average duration of the previous n mass analysis scans is greater than the desired maximum scan duration, further reducing the adjusted maximum accumulation duration, wherein n is an integer greater than 2.

20. A mass spectrometer according to claim 19, wherein the controller is configured to repeat calculating the average scan duration for the previous n mass analysis scans and further reducing the adjusted maximum accumulation duration if the average duration of the previous n mass analysis scans is greater than the desired maximum scan duration during the performing of the second set of mass analysis scans.

21. A mass spectrometer according to claim 19, wherein n is calculated based on a multiple of the number of target analytes to be identified.

22. A mass spectrometer according to claim 12, wherein:

the ion source is configured to receive a sample from the chromatography system comprising a plurality of chromatographic peaks of the sample over time; and the controller is configured to update the desired maximum scan duration and the maximum accumulation duration are over time based on the chromatographic peaks eluting from the chromatography system.

23. A mass spectrometer according to claim 12, wherein the mass analyser is an orbital trapping mass analyser.

* * * * *

UNITED STATES PATENT AND TRADEMARK OFFICE
CERTIFICATE OF CORRECTION

| | | |
|---|---|---|
| PATENT NO. | : 11,131,655 B2 | Page 1 of 1 |
| APPLICATION NO. | : 16/879603 | |
| DATED | : September 28, 2021 | |
| INVENTOR(S) | : Thoeing et al. | |

It is certified that error appears in the above-identified patent and that said Letters Patent is hereby corrected as shown below:

In the Claims

Claim 2, Column 17, Line 52: replace "A method according to" with --A method of mass spectrometry according to--, therefor.

Claim 3, Column 17, Line 52: replace "A method according to" with --A method of mass spectrometry according to--, therefor.

Claim 4, Column 17, Line 52: replace "A method according to" with --A method of mass spectrometry according to--, therefor.

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*